Oct. 11, 1966 — W. H. CULVER — 3,277,728
NUCLEAR MAGNETIC GYROSCOPE
Filed Oct. 11, 1963 — 3 Sheets-Sheet 1

INVENTOR.
WILLIAM H. CULVER

Oct. 11, 1966

W. H. CULVER 3,277,728

NUCLEAR MAGNETIC GYROSCOPE

Filed Oct. 11, 1963

INVENTOR.
WILLIAM H. CULVER

BY Wade Koont
Sherman H. Goldman
ATTORNEYS

United States Patent Office 3,277,728
Patented Oct. 11, 1966

3,277,728
NUCLEAR MAGNETIC GYROSCOPE
William H. Culver, Washington, D.C., assignor to the United States of America as represented by the Secretary of the Air Force
Filed Oct. 11, 1963, Ser. No. 316,794
9 Claims. (Cl. 74—5.6)

This invention relates generally to direction references where a conventional gyroscope would normally be utilized and more particularly involves a device in which nuclear alignment is used as a directional reference. The device of this invention takes advantage of the inertial properties of subatomic particles as a substitute for the inertial properties of gross objects in inertial navigational systems.

Previously, the gyromagnetic properties of matter have been utilized only in measurement systems for magnetic fields by correlating the magnetic effect on nuclear precession rates. In a direction sensing device or nuclear magnetic gyro, spinning atomic nuclei are proposed to be utilized to replace the conventional gyroscope. Heretofore, this has been impossible due to the disturbing effects of external magnetic fields.

The conventional electrically driven gyroscope rotor is mounted on bearings and is positioned by either one or two sets of gimbals. In addition, the gyro assembly is made to float in a fluid in order to minimize the load on the gimbal bearings and also to provide for viscous damping. The conventional gyros are limited in their performance by friction and frictional noise in the bearings, temperature gradients or temperature changes which produce mass shifts, structural flexure, and manufacturing tolerances. The first three sources of conventional gyro error do not appear in a nuclear magnetic gyro, while manufacturing dimensional tolerances are not as stringent with the nuclear device. A source of drift is present with the nuclear gyro; however, this difficulty is obviated by maintaining very low temperatures throughout the device's useful life.

The disturbing effects of external magnetic fields is eliminated in the instant device by excluding these fields from the aligned nuclei with a superconducting shield, and the alignment direction of the nuclei is sensed by a rotating pickup coil. Accordingly, the sensitivity in the number of readings that can be made is limited by the noise in an amplifier connected with the output of the coil and the period over which the device will function, which is the time required by the aligned nuclei to assume random orientation.

Thus, it is a primary object of this invention to provide a direction sensing device which may form a part of a navigational system by utilizing the orientation of the magnetic moments of atomic nuclei as a directional reference.

It is another object of this invention to provide a nuclear magnetic gyro which is relatively free from the sources of error of conventional gyros.

These and other advantages, features and objects of the invention will become more apparent from the following description taken in connection with the illustrative embodiments in the accompanying drawings, wherein.

Figure 1:
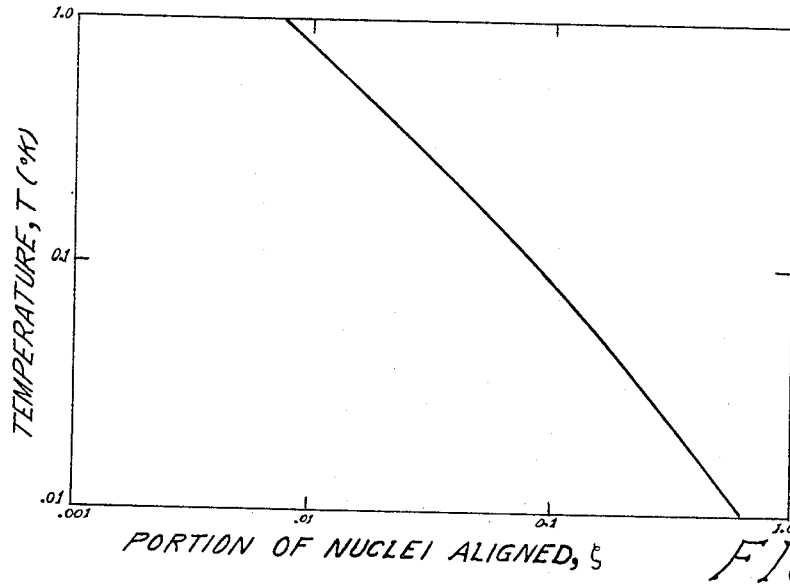
FIGURE 1 is a plot of the portion of the He$^3$ nuclei which are aligned as a function of temperature in a magnetic field of $10^5$ gauss, assuming classical statistics.

The phenomenon of nuclear magnetism relies upon the property of atomic nuclei of possessing angular momentum of $$\frac{n}{4\pi}h$$

where $n$ is a small integer depending upon the element and isotope, and $h$ (Planck's constant) is $6.61 \times 10^{-27}$ erg-sec. This angular momentum is generally expressed as $$\vec{P} = \vec{I}\frac{h}{2\pi} \quad (1)$$

where $\vec{I}$ is a half-integer in magnitude. The nuclear spin $I$ is defined as the maximum possible component of $\vec{I}$ in any given direction. A nucleus also possesses a nuclear magnetic moment which is usually expressed as $$\vec{u} = gu_N\vec{I} \quad (2)$$

where $g$ is a numerical factor, usually within the range $-4$ to $+4$, that depends upon the particular isotope, and $u_N$, the nuclear magneton of magnetic moment, is equal to $eh/4\pi M = 5.05 \times 10^{-24}$ erg gauss$^{-1}$, where $M$ is the proton mass.

In a magnetic field, B, the nuclear dipole moment will have an energy given by $$E = \frac{uB}{I}M_I \quad (3)$$

where $M_I$, the component of $\vec{u}$ in the direction of B, can take on only the $2I+1$ discrete values $I, I-1 \ldots -I$. The discrete values of $M_I$ allowed thus give rise to discrete levels of energy of interaction with the magnetic field which a nucleus may possess.

The classical dynamic behavior of a magnetic moment in a magnetic field is the result of a torque, $\vec{\tau}$, which is given by $$\vec{\tau} = \vec{u} \times \vec{B} \quad (4)$$

This torque is equal to the rate of change of the angular momentum, $\vec{P}$. In a constant field the angular momentum precesses with an angular velocity, $\vec{\omega}$, such that, $$\vec{\tau} = \vec{\omega} \times \vec{P} = \vec{u} \times \vec{B} \quad (5)$$

If a sample of a material has a net alignment of its nuclei in a given direction, it will possess a net nuclear magnetic moment which will precess about an externally applied field with the precessional angular frequency, $\omega$, given in Eq. 5. If the direction of the external field changes slowly with time, the motion of the moments will rotate so as to follow the direction of the magnetic field. By slowly changing, it is meant that the rate of change of direction of the external magnetic field is much smaller than the precessional frequency in that field.

In a condition of thermal equilibrium and in the absence of external magnetic fields the nuclei are oriented at random so that there is no net nuclear magnetic moment in a piece of the material. However, in a magnetic field the material will exhibit the phenomenon of nuclear alignment due to the tendency of the nuclei to occupy the states of lowest energy, as determined in Eq. 3.

In order that the nuclei may undergo transitions from one energy state to another there must be some mechanism whereby the nuclei and their surroundings can interact so as to exchange energy and angular momentum.

In many materials this transition is very improbable because the electronic structure of the atom can exert no torque on the nucleus. The transition probabilities between states of different $M_I$ is so low that in some solids it may take several hours for the induced magnetic moment to get within $1/e$ of its equilibrium value. This time, called the spin-lattice relaxation time, has been observed to vary from $10^{-5}$ to $10^3$ sec. in different materials.

When a material whose nuclei have come to thermal equilibrium in a magnetic field is withdrawn from the field, the nuclei tend to become disoriented again. The relaxation time in the absence of an external field, that is the time required for the net magnetic moment to decrease to $1/e$ of its former value, is in general different than the relaxation time in the presence of a field. During this time the material will possess a magnetic moment. In many substances this net moment is only very weakly coupled to the structure of the material. The net nuclear moment is free to rotate in any external magnetic field that may be present, while rotation or motion of a sphere of the material will not affect the orientation of the magnetic moment. Thus, in the absence of any external magnetic field the orientation of the magnetic moment can be used as a direction reference.

One method of producing nuclear alignment is to let the nuclei come to thermal equilibrium at low temperature in a large magnetic field. In order to increase the sensitivity of a gyro, it is desirable to have as large a dipole moment as possible, and thus it is desirable to line up all of the nuclei. There are several factors restricting the amount of alignment that can be achieved by the usual alignment procedures.

Let $\xi$ be the fraction of all the nuclei that represent the excess of the number oriented in the direction of the field over those oriented in the opposite direction. According to classical statistics at thermal equilibrium $$\xi = \tanh \frac{\mu B}{kT} = \frac{\mu B}{kT} - \frac{1}{3}\left(\frac{\mu B}{kT}\right)^3 + \cdots \quad (6)$$

where for He$^3$ $\mu = 2.129$ $\mu_N = 1.07 \times 10^{-23}$ ergs-gauss, B is the field strength in gauss, $k$, Boltzman's constant $= 1.38 \times 10^{-16}$ ergs-degree$^{-1}$, and T is the absolute temperature. To calculate $\xi$ for very low temperatures it is necessary to take into account the appropriate quantum statistics (Fermi-Dirac for atoms with half-integer spin and Bose-Einstein for atoms with integer spin).

If He$^3$ is utilized and is in the liquid state, the effect of Fermi-Dirac statistics must be considered in calculating $\xi$ at temperatures of 1° K. and below. The theoretical calculation of the exact degree of nuclear alignment at low temperatures for various field strengths is difficult, particularly in the liquid, because it requires a detailed knowledge of the low lying energy levels of the liquid. Magnetic susceptibility measurements made by Fairbank, Ard, and Walters which extend down to 0.23° K. indicate that the top of the Fermi band in the liquid at 0° K. is at $7 \times 10^{-17}$ ergs, which corresponds to $kT$ for $T=0.45°$ K. This value is about a factor lower than would be predicted on the assumption that the He$^3$ liquid has the same energy states as if it were an ideal gas. However, even at 0° K. it would require a magnetic field of the order at least $+5 \times 10^6$ gauss to align all the nuclei.

He$^3$ gas will obey Formula 6 to lower temperatures than will the liquid. The kinetic energy at the top of the Fermi distribution at 0° K. in an ideal gas is given by $$E_F = \frac{h^2}{2M} \frac{3\rho}{4Mo}^{\frac{2}{3}} \quad (7)$$

where M is the mass of the He$^3$ atom and $\rho$ is the density. The deviation from Formula 6 due to Fermi-Dirac statistics is not significant above the temperature where $kT$ is the order of $E_F$.

Figure 2:
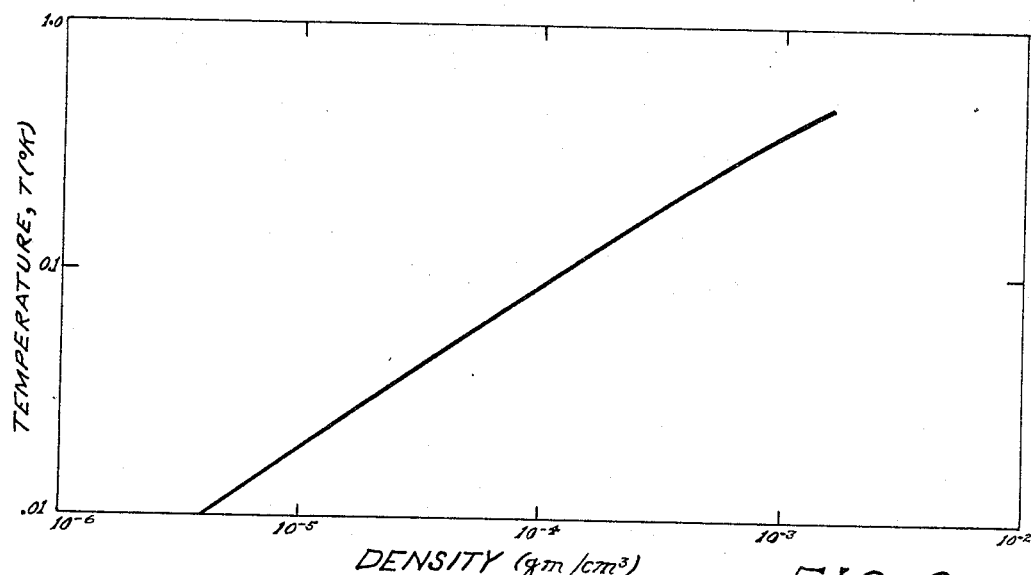
FIGURE 2 is a plot of the density of He$^3$ gas for which the energy at the top of the Fermi band is equal to $kT$, assuming an ideal gas.

FIGURE 1 indicates the temperature required to align a given portion of the nuclei of He$^3$ gas in a field of $10^5$ gauss, assuming that the density of the gas is small enough such that classical statistics can be used. The maximum density of He$^3$ gas for which the classical statistics approximation is valid is shown in FIGURE 2, assuming that He$^3$ behaves like an ideal Fermi-Dirac gas.

In a useful device, it is, of course, desirable to have a nuclear relaxation time that is long compared to its period of use. It has been estimated that obtainable relaxation times in the liquid are limited to 30 min. or less, while relaxation times in the gas may be made many times as long depending upon the gas density, the amount of impurities, and the properties of the walls of the container.

As can be seen in FIGURE 1, it is possible to align about 1 percent of the He$^3$ nuclei by allowing them to some to thermal equilibrium in a field of $10^5$ gauss at 1° K. One percent alignment will give a usable signal if the density of He$^3$ is of the order of $10^{-5}$ gm./cm.$^3$ or greater. If it is desired to use smaller densities in order to achieve the increased relaxation times, it will be necessary to use lower temperatures or higher fields to increase the alignment.

Another alignment procedure using an entirely different mechanism is possible. A method of aligning nuclei of isotopes of mercury has been proposed by Professor Bitter and his co-workers at M.I.T. By a similar method Professor Kastler and his associates at Echole Normale Superieure, Paris, have succeeded in obtaining 30 percent alignment of sodium nuclei. In principle this method can also be applied to He$^3$, in the following manner.

Figure 3:
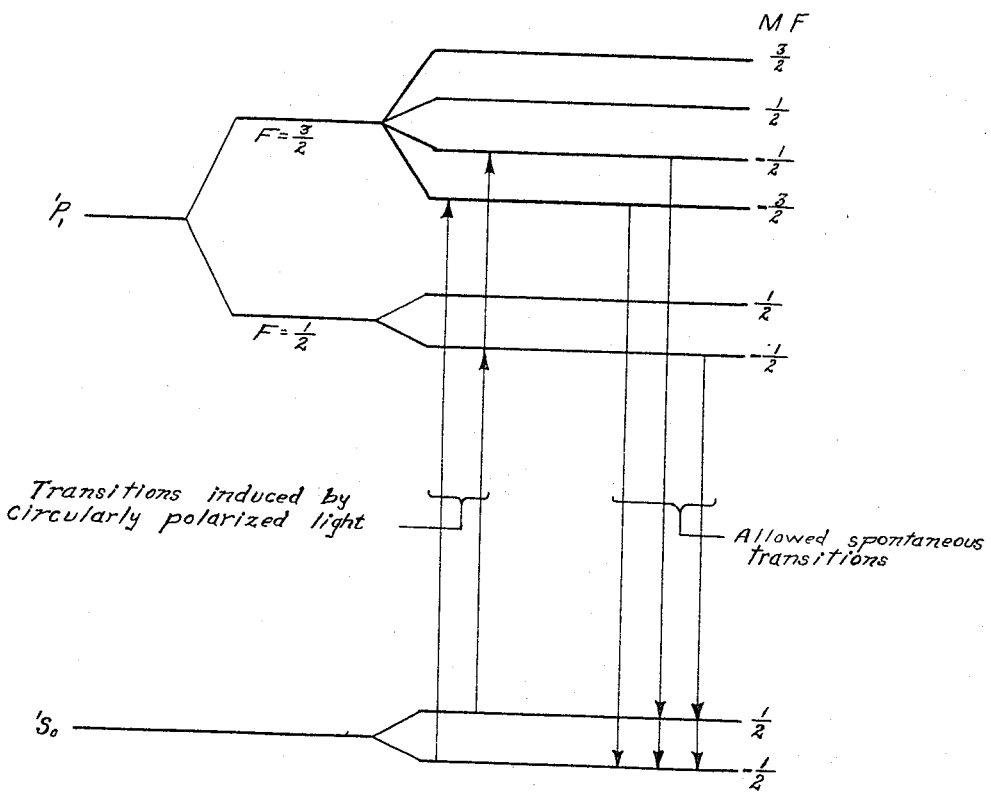
FIGURE 3 is an energy level diaphragm for levels in He$^3$ used for optical pumping.

The ground electronic state of the helium atom is a $^1S_0$ state and the first excited state from which there is a transition to the ground state is a $^1P_1$ state. The $^1P_1$ state splits into two hyperfine states having total quantum numbers, $F=\frac{3}{2}$ and $F=\frac{1}{2}$. In a small magnetic field the Zeeman effect of the hyperfine structure splits the states up into levels that can be designated as in the diagram of FIGURE 3. If circularly-polarized light of wavelength 584.4 angstroms is directed into the He$^3$ in a direction parallel to the magnetic field, transitions from the $^1S_0$ to the $^1P_1$ electronic states will be induced for which $M_F$ will change by $+1$ or $-1$ depending upon the direction of circular polarization. These induced transitions for which $M_F$ decreases by one are shown in FIGURE 3 along with the allowed spontaneous transitions down to the $^1S_0$ state. Note that once an atom gets into the $^1S_0$, $M_F = -\frac{1}{2}$ state it can never get into the $^1S_0$, $M_F = \frac{1}{2}$ state, while an atom originating in the $^1S_0$, $M_F = \frac{1}{2}$ state can end up in the state of $M_F = -\frac{1}{2}$. Thus, after a period long enough for every atom to have been excited into the $^1P_1$ state several times most all of the atoms will have been "pumped" from the $M_F = \frac{1}{2}$ state to the $M_F = -\frac{1}{2}$ state. Nearly complete alignment of the nuclei would thus be achieved.

This process is difficult not only because of the usual difficulties encountered in spectroscopic work in the far ultraviolet, but because it is necessary to produce circularly-polarized light in this region. One method for producing circularly-polarizing of the 584 angstrom radiation is to make use of the effect of the isotope shift of the 584 angstrom line of helium in conjunction with the Zeeman effect. The isotope shift between the 584 angstrom line of He$^3$ and He$^4$ is about the same as the displacement from its normal position of one Zeeman component of the line in a magnetic field of about 170,000 gauss. One Zeeman component of the He$^4$ line can be made to have the same wavelength as the He$^3$ line. In absorption one Zeeman component will absorb preferentially light circularly-polarized in one direction. Thus, circularly-polarized radiation can be obtained.

Another method of achieving nuclear alignment is to send a beam of He$^3$ atoms through a magnetic field that has a strong gradient perpendicular to the direction of flow. Discussions of atomic beam experiments in the literature indicate that a sufficient amount of material can be processed in this way to make the method feasible.

The angular frequency of precession of the net magnetic moment of aligned nuclei in an external magnetic field is given by $$\omega = \frac{\mu B}{h} = 1.03 \times 10^4 \; B \; \text{(gauss)} \qquad (7)$$

This precession will of course cause a drift of the reference direction. In an application requiring a drift of less than .01 degree for 5 min. the component of the time average external magnetic field perpendicular to the direction of nuclei alignment must be reduced to below $10^{-11}$ gauss. The usual method of obtaining magnetic field free regions, surrounding a volume with a thick shield of material of high permeability, is nowhere near adequate for this application.

The only method for obtaining magnetic fields this low is to use a shield made from superconducting material. In 1911, Kammerlingh-Onnes discovered that if various metals were cooled to temperatures of a few degrees Kelvin their electrical conductivity for small currents suddenly became infinite. A number of elements and numerous alloys have been found to have this property. It generally occurs at temperatures below 5° K., although niobium nitride has a transition temperature of 19° K. If the conductivity of a typical superconductor is not infinite, it is at least $10^{18}$ as high as conductivity measured for normal conductors even at low temperatures. A spectacular demonstration of this fact can be made by inserting a bar magnet in a lead toroid, cooling the toroid until it becomes superconducting, and then removing the magnet. Currents will flow in the toroid in such a way as to oppose any change of the originally lined magnetic flux. These currents, which can be accurately measured by measuring the magnetic moment of the toroid, have been observed in such experiments to continue undiminished for years.

Another effect that always accompanies infinite conductivity was discovered by W. Meissner in 1933. Because of the phenomenon of infinite conductivity demonstrated by the experiment cited above, it can be concluded from Lenz's law that the magnetic field present in a superconducting body will remain constant; however, Meissner found that this constant value is necessarily zero. When a homogenous body becomes superconducting, it expels all of the magnetic field that it contained before the transition and behaves as if it had zero magnetic permeability.

A discontinuous change in the tangential component of a magnetic field would require a current layer of infinite current density. Thus, one would expect that the magnetic field actually penetrates to some small but finite depth. Experiments on thin films and wires have shown that there is some slight penetration of an exterior magnetic field into a superconductor but that the field drops off very rapidly with the distance from the surface. Measured penetration depths are of the order of a few hundred angstroms. A thin foil shell of superconducting material, therefore, provides ample shielding for our purposes.

Such a shell has difficulty to be overcome in its construction as ordinarily superconductive are pierced by many tortuous paths of material that are not superconducting. Superconductivity is destroyed by the application of a magnetic field of sufficient strength. The value of this critical field is a function of both the material and its temperature. Typical values of critical fields for materials at temperatures approaching 0° K. range from a few gauss to about 2,000 gauss for niobium. Certain alloys and strained pure elements exhibit much higher critical fields (up to 15,000 gauss for strained Sn, 10,000 gauss for unstrained NbN). This critical value applies of course to the tangential field at the surface of the superconductor, which might be very high at sharp edges of a superconductor even if the applied field were small.

When a piece of pure material is made superconducting, it will not all undergo the transition at once, due to temperature differences and inhomogeneities in the material. If the boundary between the superconducting region and the normal region advances in such a way that the superconducting region is a multiply-connected region, such as a ring, some of the ambient magnetic field will be trapped in the material. As more of the material becomes superconducting, this trapped flux will be crowded into small constricted paths. Finally, the intensity of the magnetic field in these paths will exceed the critical value, making it impossible for them to ever become superconducting.

The problem of eliminating trapped flux may be best attacked by making the material superconducting in a region of zero magnetic field where no flux will be trapped. It follows that the amount of trapped flux will decrease as the ambient magnetic field is lowered. Thus, the sphere should be made superconducting in a region that is well shielded from external fields.

Since superconductors are good magnetic shields, one method of minimizing trapped flux is to make a series of shells superconducting, one inside the other. Each shell will then have less trapped flux than those outside it. The outer shells can be removed and the sphere for use in the gyro constructed inside the innermost shell.

A piece of material should be made superconducting in such a way that the boundary between the superconducting and normal state progresses in one unbroken front. This is accomplished by controlling the temperature gradients in the material and also by making gradients in the critical temperature, or by using an alloy cast in a centrifuge so that it has a gradient of the ratio of abundance of the alloyed materials.

The strength of the magnetic field at a point inside a superconducting shell is of course not only a function of the amount of flux penetrating the shell but also of the direction at which it penetrates at various areas of the shell. At a point well into the interior of a hollow shell the magnetic field will approximately equal the net average vector sum of the trapped flux over the whole shell. If a shell is constructed of a great many parts which are rearranged in a random manner after they have been made superconducting, the net vector sum of the trapped flux will be greatly reduced. One way of doing this is to make the shell a large number of flat plates placed in a stack with a hole cut out of the inside. After they have been made superconducting they would then be scrambled in a random manner.

Combination of methods such as those suggested above in producing the final superconducting magnetic shield within which the superconducting gyros may be exploited; however, there appears to be no limit to how low a magnetic field can be produced except perhaps that due to blackbody radiation within a small cavity at a temperature of a few degrees absolute.

He³, referred to in the previous discussions, is chosen as the suitable material in the preferred embodiment of this invention since it is a gas at superconducting temperatures and also has a nuclear dipole moment. In addition, He³ has the additional advantage of having the lowest boiling point (3.2° K.) of any material; therefore, it is possible to make it very free from paramagnetic impurities. The He³ nucleus has a spin of $I=\frac{1}{2}$ and a magnetic moment of $-2.129$ nuclear magnetons. Measurement of the spin-lattic relaxation time for impure liquid and gaseous He³ has been found to be 200 seconds or less. This value can be lengthened by the removal of oxygen impurities in order to achieve the ultimate length of relaxation time. The He³ may be obtained from the disintegration of tritium or as a separated component of helium normally found in commercial wells. As can be seen relative to FIGURE 4, spherical symmetry is provided within the device for the proper spherical spatial distribution of aligned nuclei.

Figure 4:
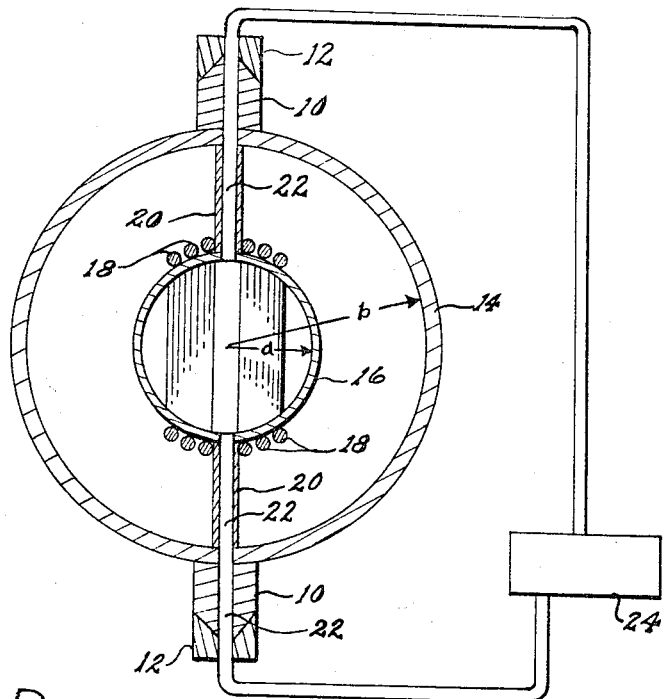
FIGURE 4 is a partially schematic representation of a nuclear gyro system where the gyro is rotated about its axis of rotation and nuclei not aligned along this axis induce an electrical signal in a pickup coil.

The embodiment of FIGURE 4 provides a substitute for the conventional gyro rotor system. A shaft 10 is arranged in bearings 12 in a conventional manner for rotation therein as is standard practice with commercial gyros. The shaft 10 forms the axis of rotation for the nuclear gyro and has between its ends a hollow sphere 14 of material which comprises a superconducting magnetic shield. In order to maintain the shield 14 at superconducting temperatures, it must be mounted within a cryostat or other environment of the proper temperature. The shell or sphere 14 may be constructed as previously described by utilizing a number of concentrically oriented shields whereby the innermost shield would be utilized for the gyro rotor. Alternatively, the shell may be constructed of a large number of individual sections rearranged in a random manner after they have been made superconductive.

A separate sphere 16 of an inert material, which is compartmented in radial sections emanating from the axis of rotation, allows for a spatial distribution of aligned nuclei with a spherical symmetry corresponding to the spherical surface presented by the interior of the superconducting shield 14. This arrangement avoids a change in configuration of the magnetic field due to nuclei within the shield when the shield is rotated. Mounted on the inner sphere 16 is a pickup coil 18 for detecting the direction of the net nuclear magnetic moment by detecting the direction of the reference field by rotation of the pickup coil relative to said reference field. The sphere 16 and coil 18 are supported by an extension 20 of the shaft 10 which contains a passageway 22 therein to allow the He³ to be presented from a source 24 of aligned nuclei. The sphere 16 with a radius $a$ and the superconducting spherical shield 14 with a radius $b$ allows the magnetic field just outside the uniformly magnetized sphere to be reduced by a factor $1 - (a/b)^3$ over the value that it would have if the sphere 16 were in free space.

Relative motion can be brought about either by precessing the reference magnetic moment or by moving the pickup coil. Since precessing the magnetic moment couses a change in reference direction, the movement of the pickup coil was chosen as the optimum method. Thus, with a spatial distribution with nearly spherical symmetry, rotation of the shaft causes rotation of the sphere of He³, the pickup coil 18 and the superconducting shield 14 with an angular velocity $\omega$.

If the net magnetic moment of the nuclei is aligned along the axis of rotation the pickup coil will not cut any lines of flux. However, if the rotation axis is rotated from the direction of orientation of the nuclei by an angle $\theta$ the pickup coil will cut lines of flux and will have induced in it an alternating voltage proportional to $\sin \theta$ and having the frequency of the rotation. The phase of this voltage will indicate the azimuth angle of the new orientation of the rotation axis.

Calculations may be shown which derive the signal voltage output, $E_S$, as a function of orientation angle and constructional parameters. The result in MKS units is as follows:

$$E_S(\text{R.M.S.}) = 2\alpha^2 \omega \rho \xi Q N \theta 10^{-6} \text{ volts}$$

where $a$ is the radius of the sphere of He³ in meters,
$\omega$ is the angular velocity of rotation of the compass in radians per sec.,
$\xi$ is the portion of the He³ aligned,
$N$ is the number of turns on the pickup coil,
$\rho$ is the density of He³ in kgm./m.³,
$Q$ is the ratio of the reactive portion of the output impedance of the pickup coils to the relative part,
$\theta$ is the angle of deviation (in radians) of the rotation axis.

In what might be a typical example let $a = 2 \times 10^{-2}$ meters
$\omega = 2 \times 10^3$ radians/sec.
$\rho = .05$ kgm./m.³
$\xi = 10^{-1}$
$Q = 10^3$
$N = 10^3$ turns
$\theta = 10^{-4}$ radian $= 5.6 \times 10^{-3}$ degree.

Then $E_S$ (R.M.S.) $\simeq 10^{-6}$ volts.

The R.M.S. Johnson noise voltage in the pickup coil is of the order of $10^{-9}$ volts or less in a one-cycle band so it can be ignored. A contributing factor toward the low Johnson noise figure is the much decreased resistivity of copper at liquid helium temperatures.

The magnetic field due to the nuclei for the example given is calculated and found to be $$B_0 = \frac{2\xi\rho\mu_0}{3} = 4 \times 10^{-9} \text{ webers/m.}^2$$

while the magnetic field at right angles to $B_0$ due to current drawn in the pickup coil is $$B_1 = \frac{\mu_0 E_S N}{2 a X_L} \simeq 4 \times 10^{-10} \text{ webers/m.}^2$$

Thus the magnetic field will be at about 6 degrees from the direction of alignment of the nuclei. The resulting torque on the nuclei will cause them to rotate so that they are aligned along the axis of rotation of the pickup coil. For the case considered the initial rotation of the nuclear alignment direction for nuclei at the center of the sphere will be of the order of 1.5 degrees/sec.

Note that the drift rate is proportional to the angle between the direction of nuclear alignment and the direction of the resultant magnetic field due to the nuclei and the current in the pickup coil. Thus the drift rate will be proportional to the deviation angle. Every time a reading is made, current must be drawn. At the signal level considered above only a few cycles of the signal would need to be read in order to read the angle to $10^{-3}$ degrees.

The utilization of a smaller magnetic moment appears to be one mode of reducing the drift rate; however, increased read out time at a lower output voltage offsets any advantages and requires an extensive read out circuit.

Figure 5:
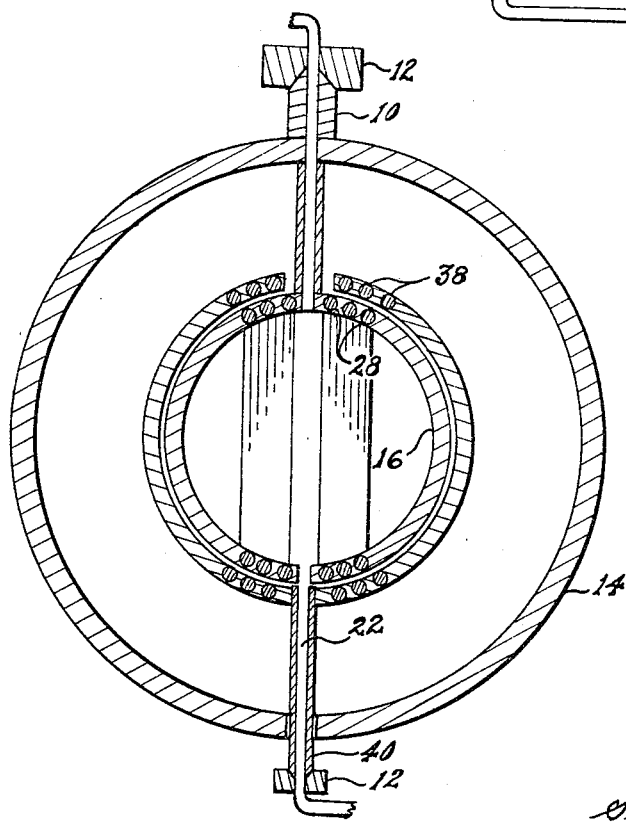
FIGURE 5 is a paritally schematic representation in cross-section of an alternate embodiment of nuclear gyro with counter rotating pickup coils.

In the embodiment of FIGURES 5, a pair of pickup coils 28 and 38 are utilized in place of coil 18 in the embodiment of FIGURE 4. Coil 28 is rotated with the shaft 10 while coil 38 is rotated in the opposite direction by means of shaft 40. Shaft 40 may be coaxial with 10 or, as shown, could provide the complete support for one end of the assembly. The passageway 22 is made to extend through shaft 40 in order that the aligned nuclei may be pumped from the source 24 to and through the sphere 16 as in FIGURE 4. Since both the coils 28 and 38 are of nearly the same diameter and have the same electrical characteristics, they will give rise to magnetic fields which very nearly cancel each other when averaged over a cycle of rotation. This feature cuts drift of the nuclei by a large factor, thereby increasing the accuracy of measurements to be made with the gyro.

It should be noted at this point that the source 24 might be any one or a combination of the methods previously described in this specification. For the purposes of this invention, it is only necessary that a spherical mass of aligned nuclei be present within the sphere 16.

It is contemplated that the coils will be lead out through the shaft 10 and/or 40 in a conventional manner to a read out circuit. Because the coils are rotated, conventional slip rings will be utilized to take off the signal from the shaft. It is also contemplated that a valve system would be utilized with the source 24 in order to present the aligned nuclei of He³ to the segmented spheres 16 for rotation therewith.

Although the invention has been described with reference to particular embodiments, it will be understood to those skilled in the art that the invention is capable of a variety of alternative embodiments within the spirit and scope of the appended claims.

I claim:
1. A nuclear gyrorotor comprising a segmented shaft mounted for rotation on the axis of rotation of said rotor, a hollow, spherical superconducting shield connecting the segments of said shaft and secured thereto, a spherical mass of aligned nuclei within and spaced from said shield, said nuclei being aligned along said axis of rotation, and a pickup coil around said mass and within said shield mounted for rotation with said shaft and shield for inducing an electrical signal when the nuclei are not aligned with the axis of rotation.

2. A rotor as defined in claim 1, including a coaxial sphere of inert material for containing said mass of aligned nuclei, said sphere being attached to said shaft for rotation therewith.

3. A rotor as defined in claim 2 wherein said inert sphere is compartmented such that rotation of said shaft causes a rotation of said nuclei.

4. A rotor as defined in claim 2 wherein said nuclei are $He^3$ and including means for supplying said aligned $He^3$ nuclei to said inert sphere.

5. A rotor as defined in claim 1 including a second coil around said first-mentioned coil and adapted for counter rotation with respect to said first-mentioned pickup coil.

6. A nuclear gyro comprising a segmented shaft, a superconducting, hollow, spherical shield between the segments of said shaft and fixedly secured to one segment of said shaft, said shaft forming the axis of rotation of said gyro, a mass of aligned nuclei coaxial with said superconducting shield and spaced therefrom, said nuclei being arranged to rotate with said shaft, a first pickup coil mounted for rotation with said mass of aligned nuclei and said superconducting shield, a second pickup coil mounted adjacent said first-mentioned pickup coil for rotation counter to the rotation of said first-mentioned pickup coil.

7. A nuclear gyro as defined in claim 6 including a coaxial sphere of inert material for containing said mass of aligned nuclei.

8. A nuclear gyro as defined in claim 7 wherein said inert sphere contains radially oriented vanes parallel to the axis of rotation.

9. A nuclear gyro as defined in claim 6 wherein said aligned nuclei comprise $He^3$ and including means for supplying aligned $He^3$ nuclei to said inert sphere.

References Cited by the Examiner

UNITED STATES PATENTS 2,871,703  2/1959  Walker _____ 74—5.34 X

FRED C. MATTERN, JR., *Primary Examiner.*

MILTON KAUFMAN, *Examiner.*

P. W. SULLIVAN, *Assistant Examiner.*